United States Patent [19]

Job et al.

[11] Patent Number: 5,229,477

[45] Date of Patent: * Jul. 20, 1993

[54] PROCESS FOR PRODUCING ETHYLENE-PROPYLENE-DIENE MONOMER TERPOLYMER

[75] Inventors: Robert C. Job; Larry L. Sterna, both of Houston, Tex.

[73] Assignee: Shell Oil Company, Houston, Tex.

[*] Notice: The portion of the term of this patent subsequent to Jul. 28, 2009 has been disclaimed.

[21] Appl. No.: 749,807

[22] Filed: Aug. 26, 1991

[51] Int. Cl.$^5$ .................... C08F 4/649; C08F 236/20
[52] U.S. Cl. .................................. 526/141; 526/124; 526/282; 526/336
[58] Field of Search ................ 526/282, 141, 124, 336

[56] References Cited

U.S. PATENT DOCUMENTS

| | | |
|---|---|---|
| 4,125,699 | 11/1978 | Yamamoto et al. ................ 526/129 |
| 4,377,671 | 3/1983 | Makino et al. ...................... 526/124 |
| 4,506,061 | 3/1985 | Makino et al. ...................... 526/142 |
| 5,001,205 | 3/1991 | Hoel ................................... 526/160 |

FOREIGN PATENT DOCUMENTS

58217507-A 6/1982 Japan .

*Primary Examiner*—Fred Teskin
*Attorney, Agent, or Firm*—Otto O. Meyers, III

[57] ABSTRACT

Ethylene-propylene-diene monomer terpolymers having a high degree of random polymerization are produced by employing a high activity, stereo-regular olefin polymerization catalyst comprising a titanium halide-containing procatalyst, an organoaluminum compound cocatalyst and a moderately hindered aromatic heterocyclic amine as selectivity control agent. The terpolymers are elastomeric and exhibit good processability.

11 Claims, No Drawings

PROCESS FOR PRODUCING ETHYLENE-PROPYLENE-DIENE MONOMER TERPOLYMER

FIELD OF THE INVENTION

This invention relates to improved terpolymers of ethylene, propylene and a diene monomer. More particularly, the invention relates to rubbery terpolymers of ethylene, propylene and a diene monomer characterized by a high degree of random polymerization.

BACKGROUND OF THE INVENTION

The class of elastomeric terpolymers of ethylene, propylene and diene monomer, conventionally referred to as EPDM polymers, is well known and has gained substantial commercial acceptance. The terpolymers are known to be useful in the production of extruded or molded articles useful for construction applications and for housings in the automotive and electrical industries. It is also known that the terpolymers can be crosslinked or vulcanized by methods which are conventional in the rubber industry, e.g., treatment with sulfur and an accelerator. In certain applications, however, the elastomeric terpolymers are difficult to process unless compounded by relatively large amounts of other materials. In many instances, the ease of processing will depend upon how "rubbery" the terpolymer is and in general, the more elastomeric the terpolymer is, the more easily it will be processed.

A number of proposals have been made to improve the processability of the ethylene-propylene-diene monomer terpolymers. In Yamamoto et al, U.S. Pat. No. 4,125,699, there are disclosed ethylene-propylene-diene monomer terpolymers having a relatively high ethylene content produced in the presence of a vanadium-containing catalyst. The polymers of Yamamoto et al are said to have improved processability because of a relatively broad molecular weight distribution. Vanadium catalysts are of relatively low activity and many if not most of the more recent commercial ethylene-propylene-diene monomer terpolymers are produced with a titanium-based catalyst because of the higher catalytic activity available through the use of such a catalyst.

In determining the elastomeric character of the ethylene-propylene-diene monomer terpolymers, a probable very important factor is the distribution of the monomeric moieties throughout the terpolymer. Without wishing to be bound by any particular theory, it appears likely that each monomer, ethylene for example, can serve to disrupt the crystallinity of a portion of a polymerized other monomer, e.g., propylene, through the prevention of block polymerization of other monomer. This disruption results in less crystallinity in the terpolymer molecule and increased elastomeric character. If any monomer of the terpolymer, and particularly the ethylene or propylene, polymerized predominantly in blocks, the structure of the resulting terpolymer would be "blocky" and the elastomeric character would be relatively low. Alternatively, a highly random structure would lead to greater elastomeric character and an improvement in properties such as processability.

In published Japanese Patent Application 58217507-A there is disclosed the use of a catalyst complex derived from a titanium trichloride, an organoaluminum compound and a phosphorus compound, the catalyst preparation being conducted in the presence of an ether. The product is said to have random character and good processability. A related polymer produced with the use of a catalyst derived from a titanium tetrahalide and an organoaluminum compound, also in the presence of an ether, is disclosed by Makino et al, U.S. Pat. No. 4,506,061. This polymer is also said to have a high degree of random polymerization. It would be of advantage, however, to provide additional ethylene-propylene-diene monomer terpolymers of improved random polymerization character and improved processability.

SUMMARY OF THE INVENTION

The present invention provides ethylene-propylene-diene monomer terpolymers of improved properties. More particularly, the present invention provides elastomeric ethylene-propylene-diene monomer terpolymers having a high degree of random polymerization in the terpolymer.

DESCRIPTION OF THE INVENTION

The present invention relates to certain ethylene-propylene-diene monomer terpolymers and to a process for the production thereof, which terpolymers are characterized by a high degree of random polymerization in the terpolymer chain. The terpolymers are produced by broadly conventional procedures but procedures which employ a particular type of nitrogen compound as a precursor of the polymerization catalyst.

The terpolymers, in addition to moieties of ethylene and propylene in the polymeric chain, also contain moieties of a diene monomer. The diene monomers suitably employed as reactants in the process of the invention have up to 20 carbon atoms and are non-conjugated dienes having no more than one carbon-carbon double bond within any polycyclic ring system. The dienes are cyclic or acyclic, and preferably are hydrocarbon dienes containing only atoms of carbon and hydrogen. Illustrative of such non-conjugated dienes are acyclic dienes such as 1,4-hexadiene, 1,6-octadiene, 4-methyl-1,4-hexadiene, 6-methyl-1,5-heptadiene, and 1,7-octadiene as well as cyclic dienes such as 1,4-cyclooctadiene, 5-ethylidine-2-norbornene, 5-methylene-2-norbornene, 5-(1-butenyl)-2-norbornene, vinylcyclohexene and 2,2'-dicyclopentadiene. Also suitable, although not literally diene monomers, are certain hydrocarbon compounds having three carbon-carbon double bonds, no two of which bonds are conjugated, such as 1,5,9-cyclododecatriene. The use of such diene monomers as the third component of the terpolymers of the invention is well known and conventional. However, in the terpolymers of the invention the use of acyclic diene monomers such as 1,7-octadiene and 1,6-heptadiene is preferred.

The polymerization process to produce the terpolymers of the invention is preferably a liquid phase process and employs a high activity, stereoregular olefin polymerization catalyst of a type more often associated with the production of homopolymeric polypropylene or polypropylene impact copolymer. In terms conventionally used to describe such catalysts, the stereoregular polymerization catalysts of high activity contain a procatalyst which is usually a titanium halide-containing solid and often contains a magnesium halide, and which usually contains an election donor. Suitable electron donors for use in the process of the invention are ethers, esters, nitriles, phosphines, phosphates, stibines, arsines, phosphoramides and alcoholates which are employed singly or in combination. The preferred electron donors utilized in the procatalysts of the invention are esters, particularly alkyl esters of aromatic monocarboxylic or dicarboxylic acids, e.g., ethyl benzoate, ethyl p-ethylbenzoate and diisobutyl phthalate, or phenols such as resorcinol.

The second catalyst constituent, conventionally termed a cocatalyst, is an organoaluminum compound which is typically a trialkylaluminum compound such as triethylaluminum or triisobutylaluminum or alternatively is a dialkylaluminum compound including dialkylaluminum halides such as diethylaluminum chloride and dipropylaluminum chloride as well as dialkylaluminum alkoxides such as diethylaluminum ethoxide. Trialkylaluminum compounds are preferred, especially triethylaluminum. The cocatalyst is provided as such or as a partial or total complex with the third catalyst constituent which is termed a selectivity control agent. Conventional selectivity control agents are illustrated by esters, particularly aromatic esters, amines, particularly hindered amines, phosphites, phosphates, silanes including alkoxysilanes and aryloxysilanes, hindered phenols and mixtures thereof. Such selectivity control agents are conventionally found in the production of homopolymeric polypropylene and polypropylene impact copolymer but are not typically found in catalysts used for the production of ethylene-propylene-diene monomer terpolymers. In the process of the invention, however, the selectivity control agent is a member of a particular class of aromatic amines as is defined below.

These high activity, stereoregular olefin polymerization catalysts are described in numerous patents and other references including Nestlerode et al, U.S. Pat. No. 4,728,705. Although a variety of chemical compounds are broadly useful as the constituents of the catalysts, a typical stereoregular olefin polymerization catalyst contains as procatalyst a solid constituent comprising a magnesium halide, a tetravalent titanium halide and an electron donor such as ethyl benzoate. The halide moieties of such procatalysts are typically chloride moieties. The cocatalyst is the organoaluminum compound which is often at least partially complexed with the selectivity control agent. Use of this type of catalyst, for example in the homopolymerization of propylene, results in a polymer product which is stereoregular, i.e., syndiotactic or isotactic, and many of the catalysts are sufficiently active to cause the formation of polymers of desirable properties directly as produced without the necessity of removing catalyst residues in a de-ashing step.

The catalysts are illustratively produced by reacting a magnesium compound, for example a magnesium alkoxide such as magnesium ethoxide, with a tetravalent titanium halide in the presence of the electron donor and optionally in the presence of a halohydrocarbon reaction diluent. The resulting solid is optionally treated with additional tetravalent titanium compound and is then washed, for example with light hydrocarbon, to remove unreacted titanium compounds. The solid catalyst is then contacted with the cocatalyst and the selectivity control agent.

The selectivity control agent employed in the process of the invention is a moderately hindered aromatic heterocyclic amine containing monovalent hydrocarbon substituents on aromatic ring carbon atoms adjacent to the heterocyclic nitrogen, which substituents provide some degree of steric or electronic hindrance but not sufficient hindrance to prohibit the operation of the aromatic heterocyclic amine as a selectivity control agent. Thus, the presence of hydrogen substituents on adjacent ring carbon atoms as in the case of pyridine does not provide any substantial hindrance and the use of pyridine as the selectivity control agent does not result in the production of the improved terpolymer compositions of the invention. Conversely, the presence of t-butyl aromatic ring substituents as in the case of 2,6-di-t-butylpyridine results in too great a hindrance to permit production of the desired terpolymers. The preferred moderately hindered aromatic heterocyclic amines are those of from 1 to 2 aromatic rings with up to one additional heterocyclic atom which have straight-chain alkyl groups independently of up to 4 carbon atoms as a substituent on each aromatic ring carbon atom adjacent to each heterocyclic nitrogen atom. Illustrative of such aromatic heterocyclic amines are 2,6-lutidine; 2,4,6-collidine, tetramethylpyrazine, 2,6-diethylpyridine, and 2,4,6-tri-n-propylpyridine. The preferred substituent groups for the adjacent aromatic ring carbon atoms are methyl groups and particularly preferred as the aromatic heterocyclic amine for use as the selectivity control agent is 2,6-lutidine.

The use of these selectivity control agents in the production of elastomeric, syndiotactic, homopolymeric polypropylene is known from copending U.S. patent application Ser. No. 342,832, filed Apr. 25, 1989. While it is postulated by Busico et al, Macromol. Chem., 184, 2193 (1983) that polypropylene polymerization catalysts which lead to syndiotactic polypropylene homopolymer are the catalysts which might facilitate the formation of alternating ethylene/propylene copolymers, specific and demonstrated examples of this hypothesis which exhibit reasonable reaction rates at reasonable reaction temperatures are not provided.

These catalysts are used in established and well known procedures to produce the terpolymers of the invention. Although a gas-phase process of producing the ethylene-propylene-diene monomer terpolymer is not precluded, the preferred processes for the production of the terpolymers are liquid phase processes employing a reaction diluent which may be a non-polymerizable diluent such as propane or a monomer of the polymerization such as propylene. These processes, which are conducted in a batchwise, continuous or semi-continuous manner, typically involves contacting ethylene, propylene and the diene monomer and the polymerization catalyst in the liquid phase under polymerization conditions. The ethylene-propylene-diene monomer terpolymer, subsequent to polymerization, is recovered by conventional methods.

Typical polymerization conditions include a reaction temperature of from about 30° C. to about 120° C., preferably from about 35° C. to about 90° C., and a pressure sufficient to maintain the reaction mixture in a liquid phase. Such pressures are up to about 20 atmospheres to about 15 atmospheres. The precise methods of conducting the polymerization and the control of the reaction conditions, including the use of molecular hydrogen to control molecular weight, are within the skill and knowledge of the art.

The ethylene-propylene-diene monomer terpolymers of the invention are suitably somewhat variable in proportions. Either monoolefin is present in a major proportion, often from about 50% by weight to about 70% by weight, preferably from about 55% by weight to about 65% by weight. The proportion of the other monoolefin is a lesser amount, e.g., from about 25% by weight to about 45% by weight with proportions from about 25% by weight to about 40% by weight being preferred. The diene monomer is present in a relatively small, although significant proportion. Amounts of diene monomer from about 1% by weight to about 8% by weight are satisfactory.

The ethylene-propylene-diene monomer terpolymers of the invention are characterized by a high degree of random polymerization as compared with EPDM polymers produced with conventional titanium-based catalysts. Expressed differently, the ethylene and propylene portions of the terpolymer are less "blocky". Due to the relatively small amount of the diene monomer present in the terpolymer, the diene monomer can be disregarded in considerations of the degree of random copolymerization. If the arrangement of ethylene and propylene moieties in the polymer chain is highly random, the location of diene monomer moieties will also be random. The highly random location of monomeric moieties in terpolymers of the invention is reflected in the improved properties of the ethylene-propylene-diene monomer terpolymers including an improved processability. The terpolymers have improved green strength and reasonably high tensile strength without the necessity for carbon black being present, thereby permitting the production of white EPDM polymers.

The degree of random polymerization of a polymer and how to measure it are discussed in "Textbook of Polymer Chemistry", Billemeyer, Jr., Interscience Publishers, New York, page 221 et seq. The extent to which various types of polymerization can and do take place is determined, at least in part, by the reactivity of a growing polymer chain terminated in one monomer toward its own monomer as compared with the reactivity toward the other monomer. When such a growing polymer chain exhibits a strong preference for reaction with the other monomer, an alternating structure is observed. When a growing polymer chain exhibits the same preference for reacting with one monomer as the other, a random copolymerization takes place and the two types of monomer will be found randomly along the polymer chain in relative amounts determined by the olefin feed. A strong preference for reacting with the same monomer leads to block polymers.

The disclosures of the Billemeyer text relative to copolymers are applied to the production of the present terpolymers when the role of diene monomer in the degree of random polymerization is disregarded as is discussed above. In the text, the term "monomer reactivity ratio" is defined for the rate constants $r_1$ and $r_2$ for a polymer chain terminating in a first monomer (e.g., propylene) and a second monomer (e.g., ethylene), respectively, reacting with its own monomer as opposed to reacting with the other monomer. The magnitude of the value is related to the tendency to react with the same monomer as that terminating the growing polymer chain. For example, if the value of $r_1$ is greater than 1, it has the significance that a chain terminating in a first monomer ($M_1$) prefers to react with additional first monomer. A value of $r_1$ less than 1 sigfnifies that the $M_1$-terminating polymer chain would prefer to react with the second monomer ($M_2$). Corresponding considerations apply to values of $r_2$. This reference further describes the type of copolymerization in terms of the product of monomer reactivity ratios, i.e., $r_1r_2$. Although the discussion of this reference is presented in terms of free radical polymerizations of a somewhat different type, the considerations apply generally to the polymerizations leading to the terpolymers of the invention when the influence of the diene monomer is disregarded. If the measured value of $r_1r_2$ is zero, the polymerization would be alternating, except for the occasional diene monomer moiety present. A value of $r_1r_2$ of 1 would represent a completely random polymerization. A value of $r_1r_2$ greater than 1 would indicate that a polymer is at least somewhat blocky and the higher the value of $r_1r_2$ is determined to be, the more blocky the polymeric chain will be. In the polymerizations of the invention the value of $r_1r_2$ is determined to be, the more blocky the polymeric chain will be. In the polymerizations of the invention the value of $r_1r_2$ will be less than about 2.1 and preferably less than about 1.7. The mathematical derivation of the $r_1r_2$ values is described in the above textbook reference.

The $r_1r_2$ value for a given polymer is traditionally determined by measuring the monomeric composition of the polymer as a function of the proportions of monomers in the feed, as is also described. An alternate and more direct method is based on the nuclear magnetic resonance (NMR) spectra of the polymer, particularly the $^{13}$C-NMR spectra, as described by Kakugo et al, Macromolecules, 15, 1150 (1982). The use of the $r_1r_2$ value is probably not a quantitative measure of the degree of random copolymerization in all cases but whenever similar molecular are used the value does give a good indication of the extent to which a polymer of at least two monomeric moieties is produced by random copolymerization.

The polymeric compositions of the invention are therefore elastomeric ethylene-propylene-diene monomer terpolymers having a relatively high degree of random polymerization, i.e., a high degree of "randomness." To the elastomeric terpolymers may be added a variety of the conventional additives for this type of polymer including stabilizers, antioxidants, fillers, colorants, processing aids and mold release agents. The ethylene-propylene-diene monomer terpolymers are processable by conventional methods such as extrusion and injection molding and have established utility as a precursor of shaped parts such as automotive and electrical housings, wire and cable coatings, as construction materials and in blending applications with other polymers. The terpolymers are also crosslinked or vulcanized by reaction with conventional sulfur species. Because of the high degree of random polymerization the terpolymers are less blocky and less crystalline and more easily processable at lower processing temperatures.

The invention is further illustrated by the following Illustrative Embodiments which should not be regarded as limiting.

ILLUSTRATIVE EMBODIMENT I

An olefin polymerization procatalyst precursor was prepared by dropwise addition of a trimethoxysilane-stabilized 12% solution of magnesium methoxide in methanol to a solution of 0.5 equivalent of 2-metholresorcinol in methanol. The precursor was a crystalline compound of the formula

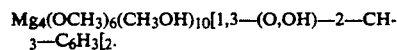

Partial azeotropic desolation of this precursor was conducted by slurrying 40 g of the precursor in 300 g of cyclohexane containing 120 g of tetramethoxysilane and boiling the resulting mixture until a 20%-30% decrease in volume had occured.

The olefin polymerization procatalyst was prepared by stirring 7.8 g of the partially desolvated procatalyst precursor with 2.5 ml (8.7 mmol) of diisobutyl phthalate in 200 ml of a 50/50 by volume solution of titanium tetrachloride and chlorobenzene for 1 hour at 115° C. The resulting solids were collected by filtering the solid-containing mixture while hot. The solids were treated with two washes at 115° C. with fresh 200 ml portions of the 50/50 solution, followed by a rinse of less than 10 minutes with 100 ml of fresh 50/50 solution. The solids were then washed once with isooctane at 90° C., twice with isooctane at room temperature, and were then dried under flowing nitrogen at 40° C. The titanium content of the resulting solids was 2.72% by weight. A portion of the dry procatalyst was then made into a 5% by weight slurry in mineral oil.

ILLUSTRATIVE EMBODIMENT II

A number of EPDM terpolymers were produced by using a catalyst prepared from the procatalyst slurry of Illustrative Embodiment I, triethylaluminum (TEA) as a 0.28M solution in isooctane and 2,6-lutidine as the selectivity control agent (SCA). For comparison purposes, a comparative catalyst (CC) was produced using diisobutyldimethoxysilane as the selectivity control agent.

The catalyst components were mixed in a TEA/SCA/Ti molar ratio of 0.70/0.20/0.01 and allowed to stand at ambient temperature for 20 minutes. The mixture was then injected into 2.7 liters of liquid propylene in a 1-gallon stainless steel autoclave also containing ethylene and diene termonomer. During polymerization, ethylene was added to the autoclave in a steady, continuous flow. The autoclave was then maintained at 60° C. for 90 minutes with continuous stirring and ethylene flow. The reactor was then cooled and the remaining propylene flashed. The resulting polymer was an amorphous solid. It was cut into small pieces and dried in air overnight and then for several hours under aspirator vacuum at 80° C.

The results of these polymerizations are shown in Table I wherein, with reference to the diene termonomer, $C_8$ represents 1,7-octadiene, $C_8'$ represents 1,6-octadiene, $C_6$ represents 1,5-hexadiene, ENB represents ethyldienorbornene and $C_2$ represents ethylene.

TABLE I

| Run | Diene | Monomer Proportions (remainder is propylene) | Catalyst, ml | Yield of Polymer, g. |
|---|---|---|---|---|
| 1 | $C_8$ | 100 ml $C_8$, 12.9% $C_2$ | 1.21 | 353 |
| 2 | $C_8$ | 100 ml $C_8$, 46.9% $C_2$ | 1.0 | 343 |
| 3 | $C_8$ | 50 ml $C_8$, 28.5% $C_2$ | 0.52 | 263 |
| 4 | $C_8$ | 100 ml $C_8$, 20.6% $C_2$ | 1.0 | 387 |
| 5 | $C_8'$ | 100 ml $C_8'$, 36.6% $C_2$ | 1.0 | 200 |
| 6 | ENB | 100 ml ENB, 24.2% $C_2$ | 1.0 | 162 |
| CC | $C_8$ | 100 ml $C_8$, 10.6% $C_2$ | 0.50 | 172 |

ILLUSTRATIVE EMBODIMENT III

To measure the tensile properties of the EPDM terpolymers, about 60 g samples of polymers produced in Illustrative Embodiment II were blended with an additive in a Brabender mixer at 190° C. In one instance, $A_1$, sulfur was added. In a second instance, $A_2$, a conventional stabilizer package containing zinc oxide was used and in a third instance, $A_3$, a conventional antioxidant "IRGANOX" ® 1010 was provided. After cooling, a 6-in×6-in×2 mm plate was compression molded from the terpolymer at 204° C. under 5 tons pressure, except for the instance where sulfur was added and the compression molding was at 20 tons and 400° C. Tensile bars were then cut from the plate using a "D" die and the tensile properties of the bars were evaluated using the procedure of ASTM D 418-3. Tensile set is the residual elongation imparted to a sample after stretching to 300% elongation at a rate of 20 inches/minute. Tensile at break is the stress required to break the sample at an elongation rate of 20 inches/minute and elongation at break is the measured elongation at the point of break. The results of these tests are shown in Table II.

TABLE II

| Polymer of Run | Additive | T set (%) | T break (psi) | E (%) |
|---|---|---|---|---|
| 1 | $A_3$, 0.3 g | 81 | 1193 | 817 |
| 2 | $A_2$, 300 mg | 93 | 549 | 850 |
| 3 | $A_1$, 130 mg | 69 | 687 | 884 |
| 5 | $A_2$, 300 mg | 104 | 619 | 867 |
| 6 | $A_2$, 390 mg | 108 | 862 | 804 |

What is claimed is:

1. In the process of producing an ethylene-propylene-diene monomer terpolymer by contacting ethylene, propylene and a non-conjugated diene monomer in the presence of a liquid reaction diluent and a high activity, stereoregular olefin polymerization catalyst comprising a titanium halide-containing procatalyst, and an organoaluminum cocatalyst and a selectivity control agent, the improvement of producing ethylene-propylene-diene monomer terpolymer having a high degree of random polymerization by incorporating in the olefin polymerization catalyst as selectivity control agent a moderately hindered aromatic heterocyclic amine containing from 1 to 2 aromatic rings with up to 1 additional heterocyclic atom and a straight-chain alkyl group as substituent on each ring carbon atom adjacent to each heterocyclic nitrogen atom.

2. The process of claim 1 wherein the aromatic heterocyclic amine is 2,6-lutidine, 2,4,6-collidine, tetramethylpyrazine, 2,6-diethylpyridine or 2,4,6-tri-n-propylpyridine.

3. The process of claim 1 wherein each alkyl griup is methyl.

4. The process of claim 3 wherein the aromatic heterocyclic amine is 2,6-lutidine.

5. The process of claim 1 wherein the ethylene content is from about 50% by weight to about 70% by weight based on total terpolymer.

6. The process of claim 5 wherein the propylene content is from about 25% by weight to about 45% by weight, based on total terpolymer.

7. The process of claim 6 wherein the diene monomer is a non-conjugated, hydrocarbon diene of up to 20 carbon atoms.

8. The process of claim 7 wherein the diene monomer content is from about 2% by weight to about 8% by weight, based on total terpolymer.

9. The process of claim 8 wherein during polymerization the product of the monomer reactivity ratio for growing polymer chains terminating in propylene and the monomer reactivity ratio for growing polymer chains terminating in ethylene is less than 2.1.

10. The process of claim 9 wherein the product of the monomer reactivity ratios is less than about 1.7.

11. The process of claim 9 wherein the aromatic heterocyclic amine is 2,6-lutidine, 2,4,6-collidine, tetramethylpyrazine, 2,6-diethylpyridine or 2,4,6-tri-n-propylpyridine.

* * * * *